(12) United States Patent
Bitzel

(10) Patent No.: US 11,850,628 B2
(45) Date of Patent: Dec. 26, 2023

(54) APPARATUS FOR APPLYING VISCOUS MATERIAL

(71) Applicant: Atlas Copco IAS GmbH, Bretten (DE)

(72) Inventor: Heiko Bitzel, Karlsruhe (DE)

(73) Assignee: ATLAS COPCO IAS GMBH, Bretten (DE)

( * ) Notice: Subject to any disclaimer, the term of this patent is extended or adjusted under 35 U.S.C. 154(b) by 0 days.

(21) Appl. No.: 17/777,339

(22) PCT Filed: Sep. 30, 2020

(86) PCT No.: PCT/EP2020/077343
§ 371 (c)(1),
(2) Date: May 17, 2022

(87) PCT Pub. No.: WO2021/121702
PCT Pub. Date: Jun. 24, 2021

(65) Prior Publication Data
US 2022/0401989 A1    Dec. 22, 2022

(30) Foreign Application Priority Data
Dec. 16, 2019 (DE) ...................... 10 2019 134 450.6

(51) Int. Cl.
*B05C 17/005* (2006.01)
*B05C 17/01* (2006.01)
(Continued)

(52) U.S. Cl.
CPC .......... *B05C 5/0279* (2013.01); *B05C 5/0237* (2013.01); *B05C 17/00553* (2013.01);
(Continued)

(58) Field of Classification Search
CPC . B05C 5/0225; B05C 17/00576; B05C 17/01; B05C 17/0116
See application file for complete search history.

(56) References Cited

U.S. PATENT DOCUMENTS 3,442,491 A * 5/1969 Friedrich ............... F02M 61/12
29/520
4,842,162 A   6/1989 Merkel
(Continued)

FOREIGN PATENT DOCUMENTS

DE        89 11 560 U1    1/1990
DE         8904972 U1     1/1990
(Continued)

OTHER PUBLICATIONS

International Search Report in PCT/EP2020/077343, dated Jan. 28, 2021.
(Continued)

*Primary Examiner* — Karl Kurple
(74) *Attorney, Agent, or Firm* — Collard & Roe, P.C.

(57) ABSTRACT

An apparatus for applying viscous material to workpieces has at least two material outlets. A needle valve is assigned to each material outlet, the valve needle of which being able to close the respective material outlet on a valve seat. Each valve needle is assigned a cylinder, in the piston chamber of which a piston is movable by pressure applied by a fluid, and which cylinder has a piston rod for impingement on the respective valve needle, the piston rod being connected to the piston, being guided out of the piston chamber on an end face facing the valve seats and extending longitudinally. The cylinders are arranged one behind the other longitudinally and the piston rod of at least one of the cylinders is guided in a sealed manner through the piston chamber of at least one further cylinder arranged closer on the valve seats.

16 Claims, 2 Drawing Sheets

(51) Int. Cl.
　　　*F16K 31/122*　　　(2006.01)
　　　*B05C 5/02*　　　(2006.01)
(52) U.S. Cl.
　　　CPC ........ *B05C 17/00576* (2013.01); *B05C 17/01* (2013.01); *B05C 17/0116* (2013.01); *F16K 31/122* (2013.01)

(56) References Cited

U.S. PATENT DOCUMENTS

| | | |
|---|---|---|
| 4,944,243 A | 7/1990 | Takeno et al. |
| 2015/0174541 A1 | 6/2015 | Koelle et al. |
| 2021/0039130 A1* | 2/2021 | Hausner ................ B05C 5/0225 |

FOREIGN PATENT DOCUMENTS

| | | |
|---|---|---|
| DE | 103 45 840 A1 | 4/2005 |
| DE | 20 2012 006 182 U1 | 7/2013 |
| DE | 10 2012 012 360 A1 | 12/2013 |
| DE | 10 2018 104 835 A1 | 9/2019 |
| EP | 0 237 190 A2 | 9/1987 |
| WO | 2013/189665 A1 | 12/2013 |

OTHER PUBLICATIONS

German Search Report in DE 10 2019 134 450.6, dated Aug. 6, 2020, with English translation of relevant parts.
English translation of the International Preliminary Report on Patentability and Written Opinion of the International Searching Authority in PCT/EP2020/077343, dated Jun. 30, 2022.

\* cited by examiner

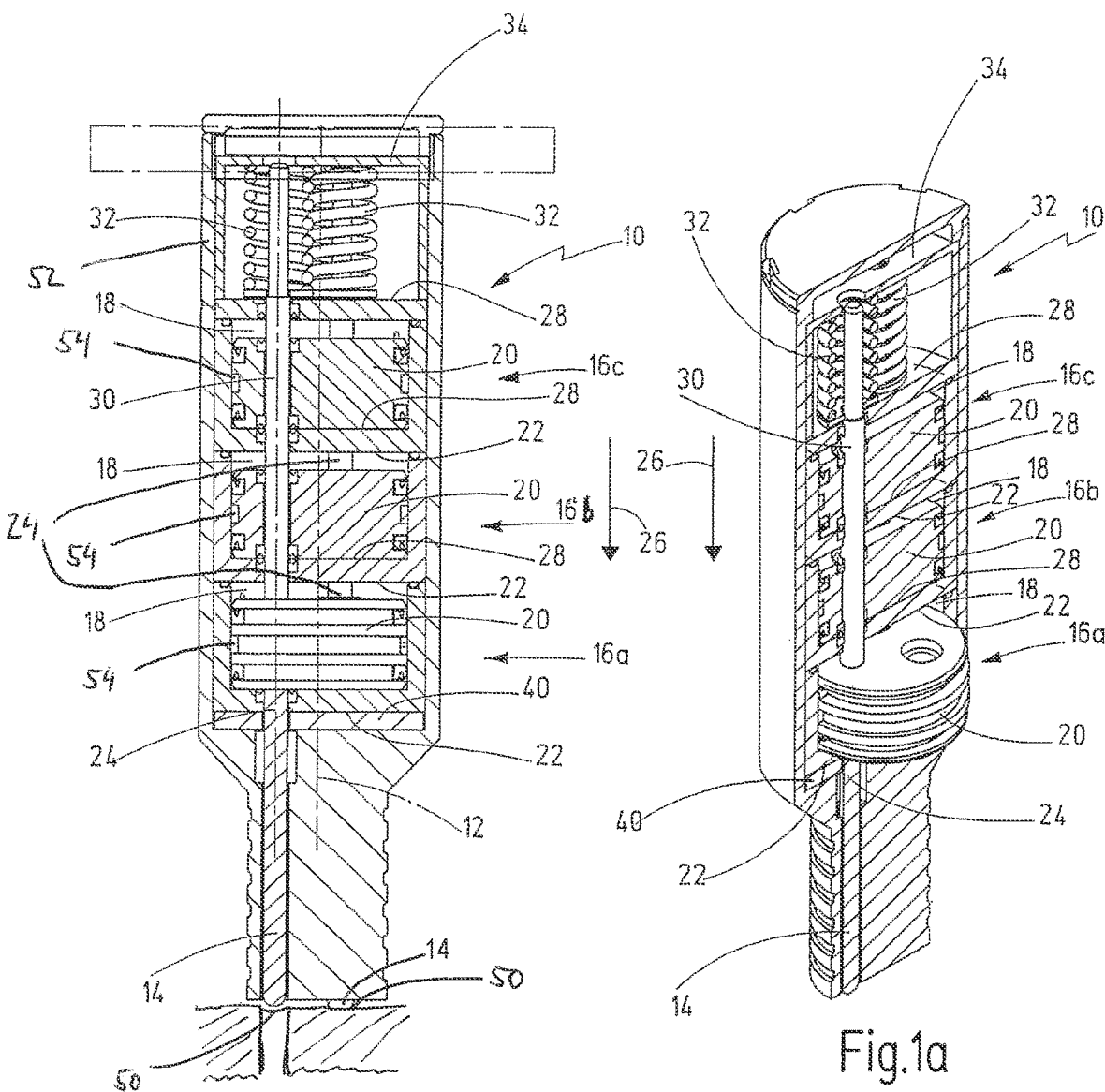
Fig.1a
Fig.1b
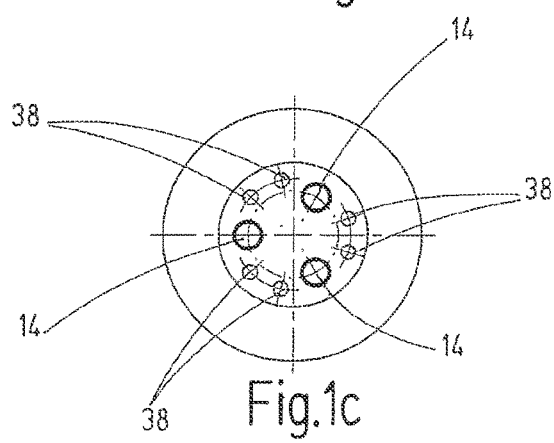
Fig.1c

APPARATUS FOR APPLYING VISCOUS MATERIAL

CROSS REFERENCE TO RELATED APPLICATIONS

This application is the National Stage of PCT/EP2020/077343 filed on Sep. 30, 2020, which claims priority under 35 U.S.C. § 119 of German Application No. 10 2019 134 450.6 filed on Dec. 16, 2019, the disclosure of which is incorporated by reference. The international application under PCT article 21(2) was not published in English.

BACKGROUND OF THE INVENTION

1. Field of the Invention

The invention relates to an apparatus for applying viscous material to workpieces.

2. Description of the Related Art

Such apparatuses, see WO 2013/189665 A1, for example, which can particularly be configured as a rotary lance, are used to apply viscous materials, such as, for example, adhesives, sealants or varnishes to workpieces. In this regard, multiple nozzles having different geometries, mounted on the rotary lance, are often used, into which nozzles a material outlet opens, in each instance. A needle valve is assigned to each material outlet, the valve needle of which closes off or releases the material outlet in question at a valve seat. Cylinders are provided to activate the valve needles, wherein each valve needle is connected with the piston of a cylinder, which is moved by means of applying pressure using a fluid, in particular compressed air. In the case of known apparatuses of the type mentioned initially, the cylinders are arranged next to one another at an equal distance from the valve seats, so that the entire apparatus has a relatively wide construction. This disadvantage has all the more weight, the more material outlets are present, and the more cylinders need to be present for activating the valve needles, for this reason.

SUMMARY OF THE INVENTION

This task is accomplished, by means of an apparatus having the characteristics according to the invention. Advantageous further developments of the invention are discussed below.

The invention is based on the idea of arranging the cylinders that serve for activation of the valve needles in a row, in other words, seen from the direction of the valve seats, one behind the other and not next to one another. The piston rods of the cylinders, with the exception of the cylinder situated closest to the valve seats, which rods serve for impacting the valve needles and can also be configured in one piece with the valve needles or can make a transition into them, must then be passed through the piston chamber(s) of the cylinders or cylinder arranged closer to the valve seats in a sealed off manner. In that the cylinders are arranged one behind the other instead of next to one another, the apparatus according to the invention can have a narrower construction, because in the region of the cylinders, its cross-section can essentially correspond to the cross-section of one cylinder and does not have to correspond to the added cross-sections of multiple cylinders arranged next to one another.

It is practical if the piston rod of every cylinder is passed through the piston chamber of each further cylinder arranged closer to the valve seats in a sealed off manner. Furthermore, it is preferred that the cross-sections of the cylinders are congruent, in the sense that all the cylinder cross-sections stand perpendicular to a common longitudinal center axis, and span the geometrical figure of a straight cylinder.

According to an advantageous further development of the invention, each piston is connected with a further piston rod, which is passed out of the corresponding piston chamber from a rear side that faces away from the valve seats, and which is passed through the piston chamber of every further cylinder arranged farther away from the valve seats in a sealed off manner. The further piston rods can then have a force applied to them by means of a reset element supported on a counter-bearing, against which force they can be moved when the corresponding valve needle is lifted off the valve seat.

Lifting off from the valve seat then takes place by means of applying pressure to the corresponding piston by means of the fluid. A closing movement, during which the valve needle is pressed onto the valve seat, takes place by means of the reset force of the reset element in question, so that a fail-safe function exists.

Since the piston rods or valve needles must be arranged next to one another, it is practical if at least a part of the piston rods and, if applicable, at least a part of the further piston rods is eccentrically connected with the corresponding piston. A centered connection with the piston is conceivable, at most, for one piston rod and one further piston rod.

According to an advantageous further development of the invention, at least one piston and preferably every piston is produced, at least in part, from ferromagnetic material, or is firmly connected with a ferromagnetic element, and a magnetic sensor is assigned to the cylinder in question, so as to determine the position of the corresponding piston in the piston chamber. This allows a rather accurate determination of the position of the piston in the corresponding piston chamber, and thereby also a determination of the position of the valve needle, as well as monitoring of the closing state of the corresponding needle valve. This measurement method only becomes practically implementable by means of the arrangement of the cylinders in a row, according to the invention, because when the cylinders are arranged next to one another, the measurement results of the sensors would be influenced by the signals of all the pistons. In this regard, it is preferred that the pistons consist of a non-ferromagnetic material, and that the corresponding ferromagnetic element, which is detected by the assigned magnetic sensor, is a band of ferromagnetic material that runs around the piston or is embedded into it.

Such apparatuses are configured, in particular, as rotary lances, in which the needle valves are accommodated in a housing and can rotate jointly around a longitudinal center axis that runs in the longitudinal direction. Feed of material to the corresponding material outlet takes place, in this regard, through a mantle of the housing, by means of a rotary passage, as is also described in detail in WO 2013/189665 A1. This embodiment allows precise positioning of the apparatus with reference to the workpiece, for example, by means of the movement of a robot.

BRIEF DESCRIPTION OF THE DRAWINGS

In the following, the invention will be explained in greater detail using an exemplary embodiment shown in the drawing. The figures show:

FIG. 1a a perspective partial view of an apparatus for applying viscous material, partly in section;

FIG. 1b a side view corresponding to the representation in FIG. 1a;

FIG. 1c a view from below, corresponding to the representation of FIG. 1a, 1b, and FIG. 2 a distributor plate for compressed air.

DETAILED DESCRIPTION OF THE PREFERRED EMBODIMENTS

Figure 2:
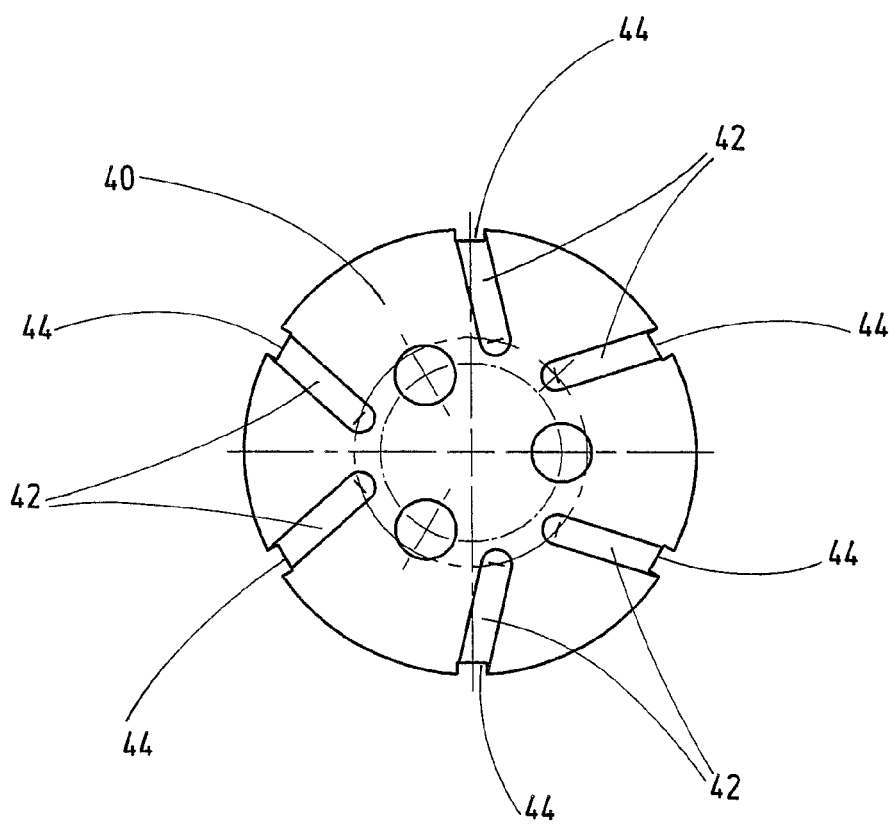

In FIG. 1a, b, c, only those parts of an apparatus for applying viscous material are shown that are essential for an understanding of the invention. In the case of the exemplary embodiment shown, this apparatus 10 is configured as a rotary lance, which is accommodated in a housing 52, see FIG. 1b, so as to rotate about its longitudinal center axis 12. The rotary lance has three needle valves, wherein a valve needle 14 is shown only for one of the needle valves. FIG. 1b shows two of the valve seats 50 on which the valve needles 14 sit, so as to block a material outlet, in each instance. In this regard, three material outlets are provided, corresponding to the number of needle valves, to which outlets viscous material is supplied, in each instance, by way of a rotary passage, through the housing, which material can exit from the material outlet by means of opening the needle valves. Each material outlet opens into an application nozzle, not shown in the drawing, wherein the rotary lance has three different application nozzles in the present case, so as to be able to achieve different application geometries of the viscous material, without having to perform a nozzle replacement.

For activation of the valve needles 14, each of them has a cylinder 16a, 16b, 16c assigned to it, in the piston chamber 18 of which a piston 20 is accommodated so as to move back and forth. A piston rod 24 that is firmly connected with the corresponding piston 20 passes out of the end face 22 of each of the cylinders 16a, 16b, 16c, which face faces the valve seats, and this rod extends parallel to the longitudinal center axis 12 in its longitudinal direction 26, and makes a transition into the valve needle 14 toward its end. A further piston rod 30 passes out of the rear side 28 of each cylinder 16a, 16b, 16c, which side faces away from the valve seats, and this rod extends toward a reset element in the form of a pressure spring 32 and is supported on the latter, which spring in turn is supported on a counter-bearing 34 that is firmly connected with the cylinders 16a, 16b, 16c. The force of the pressure springs 32 presses the further piston rods 30 and thereby also the pistons 20, the piston rods 24, and the valve needles 14 onto the valve seats 50, while lifting of the valve needles 14 from the valve seats 50 takes place by means of introducing compressed air into the piston chamber 18 of the corresponding cylinder 16a, 16b, 16c.

The cylinders 16a, 16b, 16c have identical dimensions and are arranged in a row, in other words one behind the other in the longitudinal direction 26. The piston rods 24 and the further piston rods 30 are each connected with the pistons 20 eccentrically, in other words at a distance from the longitudinal center axis 12. Because of the arrangement of the cylinders 16a, 16b, 16c in a row, the further piston rod 30 of the cylinder 16a arranged closest to the valve seats is passed through the two cylinders 16b, 16c arranged farther away from the valve seats, sealed off by means of sliding seals. In the same manner, the piston rod 24 of the cylinder 16b that is arranged in the center, is passed through the piston chamber 18 of the cylinder 16a that is arranged closer to the valve seats in a sealed off manner, while its further piston rod 30 is passed through the piston chamber 18 of the cylinder 16c, which is arranged farther away from the valve seats in a sealed off manner. The piston rod 24 of the cylinder 16c arranged farthest away from the valve seats, in contrast, is passed through the piston chamber 18 of the center cylinder 16b and the piston chamber 18 of the cylinder 16a arranged closest to the valve seats in a sealed off manner. Furthermore, the piston rods 24 and the further piston rods 30 are passed through the pistons 20 of the cylinders 16a, 16b, 16c, the piston chambers 18 of which they are passed through.

FIG. 1c shows a view from below, counter to the longitudinal direction 26. There it is shown how the valve needles 14 are arranged at equal angular distances from one another and at the same distance from the longitudinal center axis 12. Furthermore, two compressed air connections 38 are shown for each cylinder 16a, 16b, 16c, namely a compressed air connection for feed and a compressed air connection for discharge of compressed air in each instance. The compressed air connections 38 extend all the way to a distributor plate 40, where they open into intermediate channels 42 that run radially, which in turn open into compressed air channels 44 that extend axially to the corresponding cylinders 16a, 16b, 16c.

The arrangement of the cylinders 16a, 16b, 16c in a row allows monitoring of the position of the pistons 20 in the piston chamber 18 of the corresponding cylinder 16a, 16b, 16c, and thereby also monitoring of the position of the valve needles 14 with respect to the corresponding valve seat 50. For this purpose, each piston 20 is provided with a band 54 of ferromagnetic material shown in FIG. 1b that runs around it and is moved along with it. Each cylinder 16a, 16b, 16c has a magnetic sensor assigned to it, which can detect the position of the ferromagnetic band 54. Because of the arrangement of the cylinders 16a, 16b, 16c in a row, detection of the position of the ferromagnetic band 54 is reliably possible, even when the apparatus 10 is being rotated about the longitudinal center axis 12.

In summary, the following should be stated: The invention relates to an apparatus 10 for applying viscous material to workpieces, having at least two material outlets, wherein a needle valve is assigned to each material outlet, by means of the valve needle 14 of which the corresponding material outlet can be closed off at a valve seat, and wherein a cylinder 16a, 16b, 16c is assigned to each valve needle 14, in the piston chamber 18 of which cylinder a piston 20 can be moved by means of a fluid, by applying pressure, and which piston has a piston rod 24 that is connected with the piston 20, is passed through out of the piston chamber 18 at an end face 22 that faces the valve seats, and extends in a longitudinal direction 26, for applying force to the corresponding valve needle 14. According to the invention, it is provided that the cylinders 16a, 16b, 16c are arranged one behind the other in the longitudinal direction 26, and that the piston rod 24 of at least one of the cylinders 16b, 16c is passed through the piston chamber 18 of at least one further cylinder 16a, 16b arranged closer to the valve seats in a sealed off manner. Furthermore, it is practical if the cross-sections of the cylinders 16a, 16b, 16c mutually overlap, in the sense that their projections on one another overlap.

The invention claimed is:

1. An apparatus for applying a viscous material to workpieces, having at least a first material outlet and a second material outlet and at least a first cylinder and a second cylinder, wherein a first needle valve is assigned to the first material outlet and a second needle valve is assigned to the second material outlet, wherein the first material outlet can be closed off at a first valve seat by a first valve needle of the first needle valve and the second material outlet can be closed off at a second valve seat by a second valve needle of the second needle valve, and wherein the first cylinder is assigned to the first valve needle and the second cylinder is assigned to the second valve needle, wherein a first piston can be moved by applying pressure in a first piston chamber of the first cylinder using a first fluid, wherein the first piston has a first piston rod that is connected with the first piston, is passed through out of the first piston chamber at a first end face that faces the first and second valve seats, and extends in a longitudinal direction, for applying a force to the first valve needle and a second piston can be moved by applying pressure in a second piston chamber of the second cylinder using a second fluid, wherein the second piston has a second piston rod that is connected with the second piston, is passed through out of the second piston chamber at a second end face that faces the first and second valve seats, and extends in the longitudinal direction, for applying a force to the second valve needle, wherein the first and second cylinders are arranged in a row extending in the longitudinal direction, and wherein the second piston rod of the second cylinder is passed through the first piston chamber of the first cylinder so as to seal off the first piston chamber, said first cylinder being arranged closer in the longitudinal direction to the first valve seat and first end face at a first front end of the first piston rod than the second cylinder.

2. The apparatus according to claim 1, further comprising a third material outlet and a third cylinder, wherein a third needle valve is assigned to the third material outlet, wherein the third material outlet can be closed off at a third valve seat by a third valve needle of the third needle valve, and wherein the third cylinder is assigned to the third valve needle, wherein a third piston can be moved by applying pressure in a third piston chamber of the third cylinder using a third fluid, wherein the third piston has a third piston rod that is connected with the third piston, is passed through out of the third piston chamber at a third end face that faces the first, second, and third valve seats, and extends in the longitudinal direction, for applying a force to the third valve needle, wherein the first, second, and third cylinders are arranged in the row extending in the longitudinal direction, and wherein the third piston rod of the third cylinder is passed through the first piston chamber of the first cylinder so as to seal off the first piston chamber and through the second piston chamber of the second cylinder so as to seal off the second piston chamber, said second cylinder being arranged closer in the longitudinal direction to the second valve seat and second end face at a second front end of the second piston rod than the third cylinder.

3. The apparatus according to claim 1, wherein the cross-sections of the first and second cylinders are congruent.

4. The apparatus according to claim 1, wherein the first piston is connected with a further first piston rod, which is passed out of the first piston chamber from a first rear side of the first piston chamber that faces away from the first and second valve seats, and which is passed through so as to seal off the second piston chamber of the second cylinder, said second cylinder being arranged farther away in the longitudinal direction from the first and second valve seats, respectively, than the first cylinder.

5. The apparatus according to claim 4, wherein the further first piston rod has a reset force applied to the further first piston rod by a reset element supported on a counter-bearing, wherein the further first piston rod is moved against the reset force of the reset element when the first valve needle is lifted off the first valve seat.

6. The apparatus according to claim 1, wherein the first and second piston rods are eccentrically connected with the corresponding first and second pistons, respectively, at a distance from a longitudinal center axis that runs in the longitudinal direction.

7. The apparatus according to claim 1, wherein at least the first piston is produced, at least in part, from ferromagnetic material, or is connected with a ferromagnetic element, and a magnetic sensor is assigned to the first cylinder, so as to determine the position of the corresponding first piston in the first piston chamber.

8. The apparatus according to claim 7, wherein each of the first and second pistons comprises a non-ferromagnetic material, and wherein the corresponding ferromagnetic element of the first and second pistons, respectively, is a band that runs around or is embedded into the first and second pistons, respectively.

9. The apparatus according to claim 1, wherein the first and second needle valves are accommodated in a housing and can rotate jointly around a longitudinal center axis that runs in the longitudinal direction, and wherein a rotary passage is provided to feed the viscous material through a mantle of the housing, to the corresponding first and second material outlet, respectively.

10. The apparatus according to claim 2, wherein the first piston is connected with a further first piston rod, which is passed out of the first piston chamber from a first rear side of the first piston chamber that faces away from the first, second, and third valve seats, and which is passed through so as to seal off the second and third piston chambers of the second and third cylinders, respectively, said second and third cylinders being arranged farther away in the longitudinal direction from the first, second, and third valve seats, respectively, than the first cylinder, and wherein the second piston is connected with a further second piston rod, which is passed out of the second piston chamber from a second rear side of the second piston chamber that faces away from the first, second, and third valve seats, and which is passed through so as to seal off the third piston chamber of the third cylinder, said third cylinder being arranged farther away in the longitudinal direction from the first, second, and third valve seats, respectively, than the second cylinder.

11. The apparatus according to claim 10, wherein each further first and second piston rod has a reset force applied to the further first and second piston rod, respectively, by a reset element supported on a counter-bearing, wherein each further first and second piston rod is moved against the reset force of the reset element when the corresponding first valve needle and second valve needle is lifted off the first valve seat and second valve seat, respectively.

12. The apparatus according to claim 6, wherein the further first piston rod is eccentrically connected with the first piston at a distance from a longitudinal center axis that runs in the longitudinal direction.

13. The apparatus according to claim 10, wherein the first and second piston rods and the further first and second piston rods are eccentrically connected with the corresponding first and second pistons, respectively, at a distance from a longitudinal center axis that runs in the longitudinal direction.

14. The apparatus according to claim 2, wherein each of the first, second, and third pistons is produced, at least in part, from ferromagnetic material, or is connected with a ferromagnetic element, and a magnetic sensor is assigned to the first, second, and third cylinders, respectively, so as to determine the position of the corresponding first, second, and third pistons in the first, second, and third piston chambers, respectively.

15. The apparatus according to claim 1, wherein each of the first and second fluids is compressed air.

16. The apparatus according to claim 2, wherein each of the first, second, and third fluids is compressed air.

\* \* \* \* \*